US010983729B2

(12) United States Patent
Khan et al.

(10) Patent No.: US 10,983,729 B2
(45) **Date of Patent: *Apr. 20, 2021**

(54) METHOD AND APPARATUS FOR PERFORMING MULTI-OBJECT TRANSFORMATIONS ON A STORAGE DEVICE

(71) Applicant: Intel Corporation, Santa Clara, CA (US)

(72) Inventors: Jawad Basit Khan, Portland, OR (US); Peng Li, Beaverton, OR (US); Sanjeev Trika, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/702,382

(22) Filed: Dec. 3, 2019

(65) Prior Publication Data

US 2020/0218474 A1 Jul. 9, 2020

Related U.S. Application Data

(63) Continuation of application No. 15/639,838, filed on Jun. 30, 2017, now Pat. No. 10,496,335.

(51) Int. Cl.

| | |
|---|---|
| ***G06F 3/06*** | (2006.01) |
| ***G06F 13/38*** | (2006.01) |
| ***G06F 9/34*** | (2018.01) |

(52) U.S. Cl.

CPC .......... *G06F 3/0661* (2013.01); *G06F 3/0604* (2013.01); *G06F 3/0679* (2013.01); *G06F 9/34* (2013.01); *G06F 13/38* (2013.01)

(58) Field of Classification Search

CPC .... G06F 3/0668; G06F 3/0679; G06F 3/0661; G06F 3/0604; G06F 13/38

See application file for complete search history.

(56) References Cited

U.S. PATENT DOCUMENTS

| | | | |
|---|---|---|---|
| 5,928,368 A | 7/1999 | Jardine et al. | |
| 8,386,746 B2 | 2/2013 | Jiang | |
| 8,504,736 B2 | 8/2013 | Thaler et al. | |
| 9,141,292 B2 * | 9/2015 | Aswadhati | G06F 3/0688 |
| 9,263,102 B2 | 2/2016 | Flynn et al. | |
| 9,575,815 B1 | 2/2017 | Guthrie et al. | |

(Continued)

OTHER PUBLICATIONS

H. Tseng, Q. Zhao, Y. Zhou, M. Gahagan and S. Swanson, "Morpheus: Creating Application Objects Efficiently for Heterogeneous Computing," 2016 ACM/IEEE 43rd Annual International Symposium on Computer Architecture (ISCA), Seoul, 2016, pp. 53-65, doi: 10.1109/ISCA.2016.15. (Year: 2016).*

(Continued)

*Primary Examiner* — Khoa D Doan
(74) *Attorney, Agent, or Firm* — Compass IP Law PC

(57) ABSTRACT

In one embodiment, a storage device comprises non-volatile storage media; a controller to receive, from a host, an object definition command that identifies a first data object and a second data object and a transformation to apply to the first data object and the second data object to generate a first transformed object and store the first transformed object in the non-volatile storage media; and a transformation engine to apply the transformation to the first data object and the second data object.

27 Claims, 9 Drawing Sheets

(56) References Cited

U.S. PATENT DOCUMENTS 9,619,167 B2 4/2017 Khan et al.
9,619,391 B2 4/2017 Agarwal
9,652,416 B2 5/2017 Im et al.
9,742,437 B2 8/2017 Liang et al.
9,753,802 B1 9/2017 Shipilov et al.
2002/0007469 A1 1/2002 Taketa et al.
2002/0072391 A1 6/2002 Itoh et al.
2003/0120869 A1 6/2003 Lee et al.
2004/0080558 A1 4/2004 Blumenau et al.
2007/0074053 A1 3/2007 Bulusu et al.
2007/0086260 A1 4/2007 Sinclair
2007/0226428 A1 9/2007 Tremaine et al.
2008/0024899 A1 1/2008 Chu et al.
2008/0198930 A1 8/2008 Matsubayashi
2010/0077146 A1 3/2010 Hosoda
2011/0055471 A1* 3/2011 Thatcher ............... G06F 3/0608 711/114
2011/0208789 A1 8/2011 Amit et al.
2012/0079175 A1 3/2012 Flynn et al.
2014/0006859 A1 1/2014 Ryu
2014/0040698 A1 2/2014 Loh et al.
2014/0189212 A1 7/2014 Slaight et al.
2014/0215129 A1 7/2014 Kuzmin et al.
2015/0120964 A1 4/2015 Hu et al.
2015/0149739 A1 5/2015 Seo et al.
2015/0154111 A1 6/2015 D'abreu et al.
2015/0220277 A1 8/2015 Lee et al.
2015/0234908 A1 8/2015 Kung et al.
2015/0248244 A1 9/2015 Seo et al.
2015/0301930 A1 10/2015 Bruner et al.
2016/0094619 A1 3/2016 Khan et al.
2016/0241273 A1 8/2016 Shieh et al.
2016/0247575 A1 8/2016 Lin et al.
2016/0379721 A1 12/2016 Raj et al.
2017/0052908 A1 2/2017 Debenedictis
2017/0060866 A1 3/2017 Rudy et al.
2017/0169358 A1 6/2017 Choi et al.
2017/0177243 A1 6/2017 Trika et al.
2017/0220259 A1 8/2017 Choi et al.
2017/0228157 A1 8/2017 Yang et al.
2017/0344284 A1 11/2017 Choi et al.
2018/0032261 A1 2/2018 Singhai et al.
2018/0067987 A1 3/2018 Kang et al.
2018/0181322 A1 6/2018 Khan et al.
2018/0232404 A1 8/2018 Bhatti
2018/0341547 A1 11/2018 Bolkhovitin
2018/0364935 A1 12/2018 Sundrani et al.

OTHER PUBLICATIONS

Dieter Van Melkebeek, Apr. 13, 2010, University of Wisconsin, Madison Campus, Computer Science Department. (Year: 2010).

Ki, Yang Seok, et al., "In-Storage Computer: an Ultimate Solution for Accelerating I/O-intensive Applications," Samsung, Aug. 13, 2015; 30 pages.

Office Action for U.S. Appl. No. 15/639,838, dated Nov. 19, 2018, 16 pages.

Park, Dongchul, et al., "In-Storage Computing for Hadoop MapReduce Framework: Challenges and Possibilities," IEEE Transactions on Computers, Jul. 2015, 14 pages.

Wang, Jianguo, et al., "SSD In-Storage Computing for List Intersection," DaMon'16, Jun. 27, 2016, San Francisco, CA; 8 pages.

* cited by examiner

600

| OBJECT DEFINITION COMMAND | | | | | | |
|---|---|---|---|---|---|---|
| OBJECT N | COMPUTATION N | EN N | START LBA N | SOURCE NAMESPACE | OBJECT SIZE (BYTES) | OBJECT TYPE |
| ... | | | | | | |
| OBJECT 2 | COMPUTATION 3 | EN 3 | START LBA 3 | SOURCE NAMESPACE | OBJECT SIZE (BYTES) | OBJECT TYPE |
| OBJECT 1 | COMPUTATION 2 | EN 2 | START LBA 2 | SOURCE NAMESPACE | OBJECT SIZE (BYTES) | OBJECT TYPE |
| OBJECT 1 | COMPUTATION 1 | EN 1 | START LBA 1 | SOURCE NAMESPACE | OBJECT SIZE (BYTES) | OBJECT TYPE |
| OBJECT 0 | RESERVED | N/A | START LBA0 | SOURCE NAMESPACE | OBJECT SIZE (BYTES) | OBJECT TYPE |
| PRP LIST | | | | | | |
| # OF OBJECTS | | CMD ID | | | OPCODE | |

| OBJECT DEFINITION COMMAND | | | | | | |
|---|---|---|---|---|---|---|
| OBJECT N | COMPUTATION N | 1 | START LBA N | SOURCE NAMESPACE | OBJECT SIZE (BYTES) | OBJECT TYPE |
| ... | | | | | | |
| OBJECT 2 | "\| - \|" | 1 | START LBA 3 | SOURCE NAMESPACE | OBJECT SIZE (BYTES) | OBJECT TYPE |
| OBJECT 1 | 0 | 0 | START LBA 2 | SOURCE NAMESPACE | OBJECT SIZE (BYTES) | OBJECT TYPE |
| OBJECT 1 | "\| - \|" | 1 | START LBA 1 | SOURCE NAMESPACE | OBJECT SIZE (BYTES) | OBJECT TYPE |
| OBJECT 0 | 0 | N/A | START LBA0 | SOURCE NAMESPACE | OBJECT SIZE (BYTES) | OBJECT TYPE |
| PRP LIST | | | | | | |
| # OF OBJECTS | | CMD ID | | | OPCODE | |

| UNIQUE OBJECT ID | COMPUTATION # | START LBA | LBA LENGTH | OBJECT SIZE (BYTES) | OBJECT TYPE |
|---|---|---|---|---|---|
| OBJECT ID 1 | 0 | LBA X | M | U | A |
| OBJECT ID 2 | 0 | LBA Y | N | V | B |
| ... | | | | | |

FIG. 8

METHOD AND APPARATUS FOR PERFORMING MULTI-OBJECT TRANSFORMATIONS ON A STORAGE DEVICE

RELATED APPLICATIONS

This application is a continuation of U.S. patent application Ser. No. 15/639,838, filed on Jun. 30, 2017, now U.S. Pat. No. 10,496,335 and entitled “METHOD AND APPARATUS FOR PERFORMING MULTI-OBJECT TRANSFORMATIONS ON A STORAGE DEVICE”. The entire specification of which is hereby incorporated herein by reference in its entirety.

FIELD

The present disclosure relates in general to the field of computer development, and more specifically, to object calculations on a storage device.

BACKGROUND

A solid state drive (SSD) is a data storage device that uses integrated circuit assemblies as non-volatile memory to store data persistently. The SSD may be coupled to a host computing system, such as a personal computer or a server, where the host computing system performs input/output (I/O) operations on the SSD, and where the I/O operations may include writing data to the SSD and reading data from the SSD.

BRIEF DESCRIPTION OF THE DRAWINGS

FIG. 6 illustrates a block diagram of an object definition command transmitted from a host to a storage device in accordance with certain embodiments, FIG. 7 illustrates a block diagram of an object definition command for processing an image frame difference in accordance with certain embodiments.

FIG. 8 illustrates an example object lookup table of storage device in accordance with certain embodiments.

Like reference numbers and designations in the various drawings indicate like elements.

DETAILED DESCRIPTION

Although the drawings depict particular computer systems, the concepts of various embodiments are applicable to any suitable computer systems. Examples of systems in which teachings of the present disclosure may be used include desktop computer systems, server computer systems, storage systems, handheld devices, tablets, other thin notebooks, system on a chip (SOC) devices, and embedded applications. Some examples of handheld devices include cellular phones, digital cameras, media players, personal digital assistants (PDAs), and handheld PCs. Embedded applications may include microcontrollers, digital signal processors (DSPs), SOCs, network computers (NetPCs), set-top boxes, network hubs, wide area networks (WANs) switches, or any other system that can perform the functions and operations taught below. Various embodiments of the present disclosure may be used in any suitable computing environment, such as a personal computing device, a server, a mainframe, a cloud computing service provider infrastructure, a datacenter, a communications service provider infrastructure (e.g., one or more portions of an Evolved Packet Core), or other environment comprising one or more computing devices.

Figure 1:
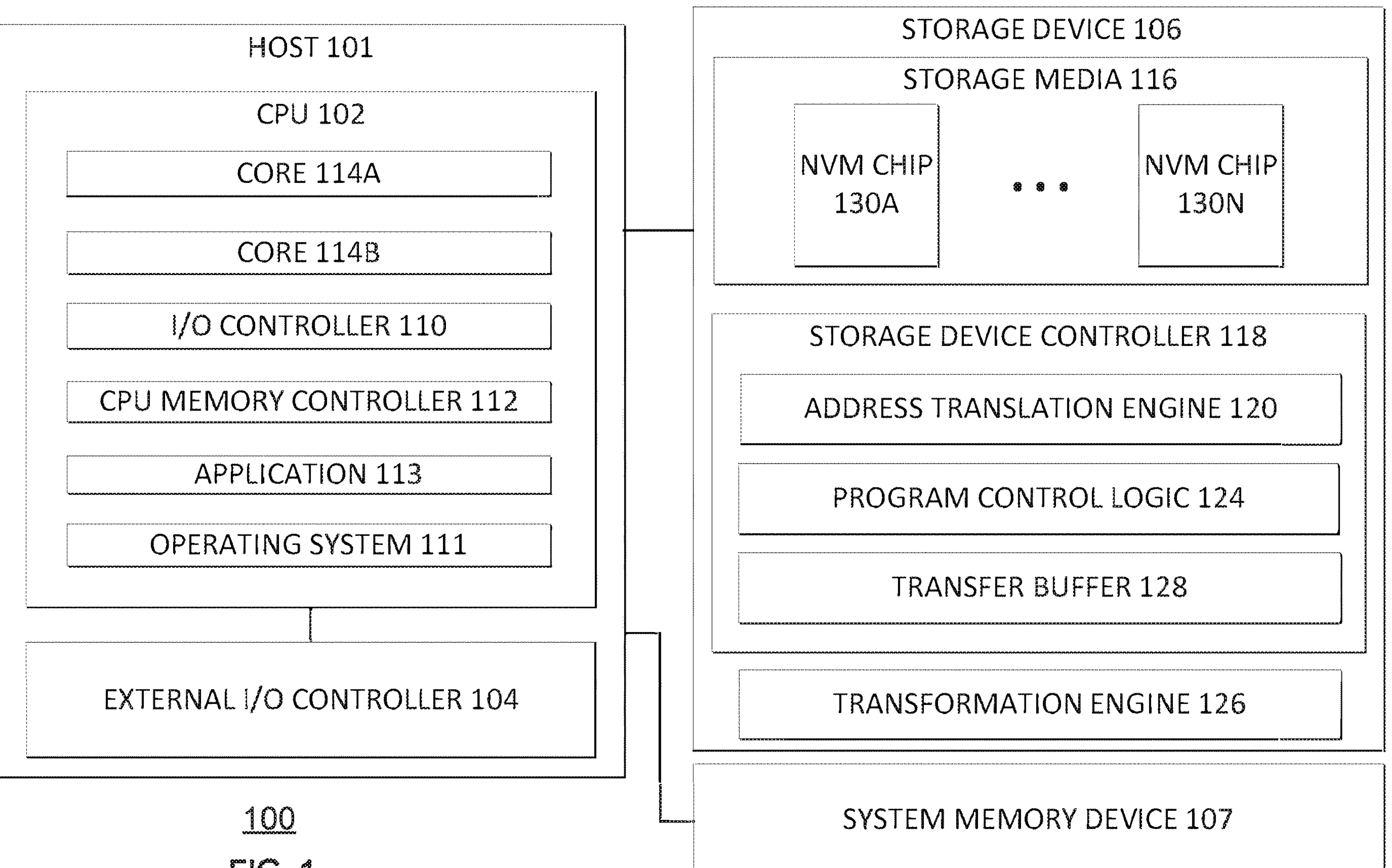
FIG. 1 illustrates a block diagram of components of a computer system in accordance with certain embodiments.

FIG. 1 illustrates a block diagram of components of a computer system 100 in accordance with certain embodiments. System 100 includes a central processing unit (CPU) 102 coupled to an external input/output (I/O) controller 104, a storage device 106 (which in various embodiments may be a solid state drive), and a system memory device 107. During operation, data may be transferred between storage device 106 and CPU 102, between system memory device 107 and CPU 102, or between storage device 106 and system memory device 107. In various embodiments, particular commands (e.g., requesting read, write, erase operations, and/or any of the transformation related commands described herein) involving a storage device 106 or system memory device 107 may be issued by an operating system 111 and/or other logic (e.g., application 113) executed by the CPU 102.

In some computing applications, data may be transformed before being committed to long term storage. In typical computing systems, data to be transformed may first be transferred by a CPU of a host computing system from an input/output (I/O) device (e.g., a camera, a microphone, a card, etc.) to system memory (e.g., dynamic random access memory) of the host. The CPU may then access the data and perform the transformations on the data. Once the transformed data is generated, the CPU may request that the transformed data be stored in a storage device (e.g., a hard disk drive or SSD). Relying on the host to perform the transformations may cause unnecessary latencies and strain system resources of the host (e.g., CPU cycles, storage bus bandwidth, system memory capacity).

Various embodiments of the present disclosure provide a mechanism for offloading the task of performing transformations on objects from a host to a storage device such as an SSD. In a particular embodiment, CPU 102 may transfer data to be transformed (e.g., data received from an I/O device) to the system memory device 107. However, instead of transforming the data (e.g., by executing instructions by the cores 114), the data is sent to storage device 106 along with a request to perform one or more transformations. The storage device then performs the transformations and stores the results. In some embodiments, CPU 102 may offload the processing and the storing of both the original and transformed data to the storage device 106, thus saving valuable CPU cycles and system memory bandwidth.

In various embodiments, the storage device 106 is capable of applying a set of transformations (object transformations are also referred to herein as calculations) to multiple incoming objects from a host. A host may refer to any suitable computational device (e.g., a laptop computer, a desktop computer, a tablet, a cell phone, a processor, a server, a disk array, etc.) or a component thereof, such as a processor of a computational device. An object may be a uniquely identifiable collection of data. The data may have a specific format or meaning to the host and the storage device 106. For example, an image object may describe an image in a format, such as Joint Photographic Experts Group (JPEG), Graphics Interchange Format (GIF), Portable Network Graphics (PNG), etc. Other examples of objects may include audio objects, video objects, or even an arbitrary object with a special meaning for the host, where the object may be transformed by the storage device 106. The objects may be of an arbitrary size. The objects may also be referred to herein as data objects.

The host 101 may discover the object transformation capabilities of the storage device 106 and then issue commands to the storage device 106, where the commands may specify the objects and the transformations to apply to the objects. The original data as well as the transformed data may be stored in the storage device 106. Because the storage device 106 retains the original data, the host 101 can efficiently perform layered processing, use the storage device 106 for sophisticated analytics, and for machine learning applications. Optionally (e.g., via a specification in the request by the host), intermediate transformations (i.e., transformations performed in the process of reaching a final result) of the original data may also be stored in the storage device 106. The storage device 106 frees up valuable processing cycles and system memory on the host, as the storage device 106 has the capability to apply appropriate transformations based on the object type. This may be particularly useful in low latency applications that require hardware acceleration and storage.

Storage device 106 may be configured to perform any suitable transformations (in some embodiments, the firmware of the storage device 106 may be updated to support newly added transformation functions or any suitable hardware that performs the functions may be removably coupled to the storage device 106, such as a field-programmable gate array (FPGA), application-specific integrated circuit (ASIC), or processor). As non-limiting examples, the storage device 106 may perform any one or more of the following transformations on two or more objects: matrix and vector operations, dot products, norm, various distance calculations, various image or audio processing operations, or any other processing operations. In various embodiments, the storage device 106 may also be capable of performing transformations on single objects. Non-limiting examples of such operations include encryption, compression, image processing operations, audio processing operations, extraction of information, or any other processing operations.

Various embodiments may also provide a mechanism to save the state of an object manipulation in the event of a power loss to the storage device 106 and resume the object manipulation upon the restoration of power. A particular embodiment may allow a completion command to be sent to the host for an object calculation command while the storage device 106 processes calculations in the background (i.e., before the calculations actually finish). In a particular embodiment, a data transformation may be performed on-the-fly via a read command sent from the host 101 to the storage device 106.

CPU 102 comprises a processor, such as a microprocessor, an embedded processor, a digital signal processor (DSP), a network processor, a handheld processor, an application processor, a co-processor, a system on a chip (SoC), or other device to execute code (i.e., software instructions). The CPU 102, in the depicted embodiment, includes two processing elements (cores 114A and 114B in the depicted embodiment), which may include asymmetric processing elements or symmetric processing elements. However, a processor may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 114 may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

I/O controller 110 is an integrated I/O controller that includes logic for communicating data between CPU 102 and I/O devices. An I/O device may refer to any suitable logic capable of transferring data to and/or receiving data from an electronic system, such as CPU 102. For example, an I/O device may comprise a controller of an audio/video (A/V) device such as a graphics accelerator; a controller of a data storage device such as an SSD (e.g., an SSD based on 3D crosspoint memory or NAND flash memory), HDD, or optical storage disk; a wireless transceiver; a network processor; a network interface controller; or a controller for another device such as a monitor, printer, mouse, keyboard, camera, card, microphone, or scanner; or other suitable device. In a particular embodiment, an I/O device may comprise storage device controller 118 of storage device 106.

An I/O device may communicate with the I/O controller 110 of the CPU 102 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), Institute of Electrical and Electronics Engineers (IEEE) 802.3, IEEE 802.11, or other current or future signaling protocol. In particular embodiments, I/O controller 110 and the underlying I/O device may communicate data and commands in accordance with a logical device interface specification such as Non-Volatile Memory Express (NVMe) (e.g., as described by one or more of the specifications available at www.nvmexpress.org/specifications/) or Advanced Host Controller Interface (AHCI) (e.g., as described by one or more AHCI specifications such as Serial ATA AHCI: Specification, Rev. 1.3.1 available at http://www.intel.com/content/www/us/en/io/serial-ata/serial-ata-ahci-spec-rev1-3-1.html). In various embodiments, I/O devices coupled to the I/O controller may be located off-chip (i.e., not on the same chip as CPU 102) or may be integrated on the same chip as the CPU 102.

The CPU 102 may also be coupled to one or more other I/O devices (such as any of those listed above or other suitable I/O devices) through external I/O controller 104. In a particular embodiment, external I/O controller 104 may couple a storage device 106 to the CPU 102. External I/O controller 104 may include logic to manage the flow of data between one or more CPUs 102 and I/O devices. In particular embodiments, external I/O controller 104 is located on a motherboard along with the CPU 102. The external I/O controller 104 may exchange information with components of CPU 102 using point-to-point or other interfaces.

CPU memory controller 112 is an integrated memory controller that includes logic to control the flow of data going to and from one or more system memory devices 107. CPU memory controller 112 may include logic operable to read from a system memory device 107, write to a system memory device 107, or to request other operations from a system memory device 107. In various embodiments, CPU memory controller 112 may receive write requests from cores 114 and/or I/O controller 110 and may provide data specified in these requests to a system memory device 107 for storage therein. CPU memory controller 112 may also read data from a system memory device 107 and provide the read data to I/O controller 110 or a core 114. During operation, CPU memory controller 112 may issue commands including one or more addresses of the system memory device 107 in order to read data from or write data to memory (or to perform other operations). In some embodiments, CPU memory controller 112 may be implemented on the same chip as CPU 102, whereas in other embodiments, CPU memory controller 112 may be implemented on a different chip than that of CPU 102. I/O controller 110 may perform similar operations with respect to one or more storage devices 106.

A system memory device 107 may store any suitable data, such as data used by CPU 102 to provide the functionality of computer system 100. For example, data associated with programs that are executed by or files accessed by cores 114 may be stored in system memory device 107. Thus, a system memory device 107 may include a system memory (sometimes referred to as a main memory) that stores data and/or sequences of instructions that are executed or otherwise used by the cores 114. In some embodiments, a system memory device 107 may store persistent data (e.g., a user's files or instruction sequences) that maintains its state even after power to the system memory device 107 is removed. A system memory device 107 may be dedicated to a particular CPU 102 or shared with other devices (e.g., one or more other processors or other device) of computer system 100.

In various embodiments, a system memory device 107 may include a memory comprising any number of memory modules, a memory device controller, and other supporting logic (not shown). A memory module may include non-volatile memory and/or volatile memory.

Non-volatile memory is a storage medium that does not require power to maintain the state of data stored by the medium. In various embodiments, non-volatile memory may be byte or block addressable. Nonlimiting examples of nonvolatile memory may include any or a combination of: solid state memory (such as planar or 3-dimensional (3D) NAND flash memory or NOR flash memory), 3D crosspoint memory, memory that uses chalcogenide phase change material (e.g., chalcogenide glass), ferroelectric memory, silicon-oxide-nitride-oxide-silicon (SONOS) memory, polymer memory (e.g., ferroelectric polymer memory), ferroelectric transistor random access memory (Fe-TRAM) ovonic memory, anti-ferroelectric memory, nanowire memory, electrically erasable programmable read-only memory (EEPROM), a memristor, single or multi-level phase change memory (PCM), Spin Hall Effect Magnetic RAM (SHE-MRAM), and Spin Transfer Torque Magnetic RAM (STTRAM), a resistive memory, magnetoresistive random access memory (MRAM) memory that incorporates memristor technology, resistive memory including the metal oxide base, the oxygen vacancy base and the conductive bridge Random Access Memory (CB-RAM), a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory.

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In some embodiments, any portion of system memory 107 can comply with Joint Electron Device Engineering Council (JEDEC) standards including but not limited to Double Data Rate (DDR) standards, e.g., DDR3, 4, and 5, or Low Power DDR4 (LPDDR4) as well as emerging standards.

A storage device 106 may store any suitable data, such as data used by CPU 102 to provide functionality of computer system 100. For example, data associated with programs that are executed or files accessed by CPU 102 may be stored in storage device 106. In various embodiments, a storage device 106 may store persistent data (e.g., a user's files or software application code) that maintains its state even after power to the storage device 106 is removed. A storage device 106 may be dedicated to CPU 102 or shared with other devices (e.g., another CPU or other device) of computer system 100.

In the embodiment depicted, storage device 106 includes storage media 116, storage device controller 118, and transformation engine 126. Storage media 116 includes one or more non-volatile memory chips 130A through 130N (including any of the non-volatile memories listed above). In other embodiments, storage media 116 may include volatile memory (including any of the volatile memories listed above). Storage device controller 118 includes transfer buffer 128. Buffer 128 and NVM Chips 130 each include a plurality of memory cells that are each operable to store one or more bits of data. The cells may be arranged in any suitable fashion, such as in rows (e.g., wordlines) and columns (e.g., bitlines), three dimensional structures, sectors, or other manner. In various embodiments, the cells may be logically grouped into banks, blocks, subblocks, wordlines, pages, frames, bytes, or other suitable groups.

Buffer 128 may include non-volatile and/or volatile memory (including any of the non-volatile and/or volatile memories listed above) to store data that is used during the performance of transformations by storage device 106. In particular embodiments, buffer 128 is a volatile memory, such as an SRAM. In some embodiments, buffer 128 may be relatively high speed memory compared to the memory of NVM chips 130A-N. In some embodiments, the buffer 128 may be used by the storage device 106 to initially store objects that are received from the host 101 prior to transformation of the objects. The buffer 128 may also temporarily hold intermediate and final results while performing transformations on the objects. Each non-volatile memory chip 130 comprises a semiconductor chip with one or more arrays of non-volatile memory. The NVM chips 130 may store original data objects and/or transformed data objects (i.e., results of object transformation operations).

Storage device 106 includes a transformation engine 126 that is configured to apply transforms to a plurality of objects, where the objects are either written by the host 101 to the storage device 106 or are retrieved by the storage device 106 from the host 101 via pointers received from the host 101 in an object definition command (an object definition command may specify one or more objects and one or more transformations to apply to the one or more objects). The objects may be transformed into one or more transformed objects which are then stored on an NVM chip 130. Transformation engine 126 may comprise any suitable logic, such as an FPGA, fixed logic, or a processor to perform the transformations. In various embodiments, transformation engine 126 may include separate hardware modules for each of at least a subset of the transformations that the transformation engine 126 is capable of performing.

In various embodiments, storage device 106 may comprise a solid state drive; a hard disk drive; a memory card; a Universal Serial Bus (USB) flash drive; an NVDIMM; storage integrated within a device such as a smartphone, camera, or media player; or other suitable mass storage device. In a particular embodiment in which storage device 106 is a solid state drive or NVDIMM, NVM chips 130 may comprise flash memory, such as NAND flash memory or NOR flash memory. However, storage media 116 may include any of the volatile or non-volatile memories listed above or other suitable memory.

Storage device 106 may be coupled to CPU memory controller 112 or I/O controller 110. Storage device 106 may include any suitable interface to communicate with CPU memory controller 112 or I/O controller 110 using any suitable communication protocol such as a DDR-based protocol, PCI, PCIe, USB, SAS, SATA, FC, System Management Bus (SMBus), or other suitable protocol. A storage device 106 may also include a communication interface to communicate with CPU memory controller 112 or I/O controller 110 in accordance with any suitable logical device interface specification such as NVMe, AHCI, or other suitable specification. In particular embodiments, storage device 106 may comprise multiple communication interfaces that each communicate using a separate protocol with CPU memory controller 112 and/or I/O controller 110.

Storage device controller 118 may include logic to receive requests from CPU 102 (e.g., via CPU memory controller 112 or I/O controller 110), cause the requests to be carried out with respect to storage media 116 and/or transformation engine 126, and provide data associated with the requests to CPU 102 (e.g., via CPU memory controller 112 or I/O controller 110). Controller 118 may also be operable to detect and/or correct errors encountered during memory operation. In an embodiment, controller 118 may also track the number of times particular cells (or logical groupings of cells) have been written to in order to perform wear leveling and/or to detect when cells are nearing an estimated number of times they may be reliably written to. In performing wear leveling, the storage device controller 118 may evenly spread out write operations among blocks of the memory of storage media 116 such that particular blocks are not written to more than other blocks. In various embodiments, controller 118 may also monitor various characteristics of the storage device 106 such as the temperature or voltage and report associated statistics to the CPU 102. Storage device controller 118 can be implemented on the same circuit board or device as storage media 116 or on a different circuit board, or device. For example, in some environments, storage device controller 118 may be a centralized storage controller that manages memory operations for multiple different storage media 116 (which could each be of the same type of memory or could be of different types) of computer system 100 (and thus could provide storage device controller functionality described herein to any of the memories to which it is coupled).

In various embodiments, the storage device 106 also includes an address translation engine 120. In the depicted embodiment, the address translation engine 120 is shown as part of the storage device controller 118, although in various embodiments, the address translation engine 120 may be separate from the storage device controller 118 and communicably coupled to the storage device controller 118. In various embodiments, the address translation engine 120 may be integrated on the same chip or package as the storage device controller 118 or on a different chip or package.

In various embodiments, address translation engine 120 may include logic (e.g., one or more indirection tables) to store and update a mapping between a logical address space (e.g., an address space visible to a computing host coupled to the storage device 106) and the physical address space of the storage media 116 of the storage device 106 (which may or may not be exposed to the computing host). The logical address space may expose a plurality of logical groups of data which are physically stored on corresponding physical groups of memory addressable, by the storage device 106, through the physical address space of the storage device 106. A physical address of the physical address space may comprise any suitable information identifying a physical memory location (e.g., a location within storage media 116) of the storage device 106, such as an identifier of the storage device 106 on which the physical memory location is located, an identifier of a module (such as a package, chip, memory array, disk or other module) of the storage media 116 on which the physical memory location is located, one or more pages of the physical memory location, one or more subblocks of the physical memory location, one or more wordlines of the physical memory location, one or more bitlines of the physical memory location, one or more disk sectors of the physical memory location, and/or other suitable identifiers or encodings thereof. In general, a logical address and a corresponding physical address have the same granularity. For example, a logical address comprising an LBA may correspond to a physical address of a physical block of memory of the storage device 106. In a particular embodiment, an LBA specifies the minimum amount of data that may be referenced using a write command (which may sometimes be referred to as a page). In various example, a logical address may refer to a block size of 512 bytes, 1 Kilobyte (KB), 2 KB, 4 KB, or other suitable block size.

The address translation engine 120 or other portion of storage device 106 may include any suitable memory type for storing logical to physical mapping structures and related information and any suitable logic for changing values stored in the logical to physical mapping structures (e.g., in response to a request from the storage device controller 118) and reading values from the logical to physical mapping structures (e.g., to provide the values to the storage device controller 118 for use in memory operations).

Storage media for the logical to physical mapping structures and other information may be included within the address translation engine 120 and/or storage device controller 118 or may be communicably coupled to the address translation engine and/or storage device controller. In various embodiments, storage media for the logical to physical mapping structures and other information may be integrated on the same package or chip as the storage device controller 118 and/or address translation engine 120 or may be implemented on a separate package or chip.

In various embodiments, the storage device 106 also includes program control logic 124 which is operable to control the programming sequence performed when data is written to or read from storage media 116. In various embodiments, program control logic 124 may provide the various voltages (or information indicating which voltages should be provided) that are applied to memory cells during the programming and/or reading of data (or perform other operations initiating data reads or writes), perform error correction, and perform other suitable functions (such as perform garbage collection).

In various embodiments, the program control logic 124 may be integrated on the same chip as the storage device controller 118 or on a different chip. In the depicted embodiment, the program control logic 124 is shown as part of the storage device controller 118, although in various embodiments, all or a portion of the program control logic 124 may be separate from the storage device controller 118 and communicably coupled to the storage device controller 118. For example, all or a portion of the program control logic 124 may be located on the same package or chip as storage media 116. In various embodiments, the transfer buffer 128 may be integrated on the same chip as the storage device controller 118 or on a different chip.

In some embodiments, all or some of the elements of system 100 are resident on (or coupled to) the same circuit board (e.g., a motherboard). In various embodiments, any suitable partitioning between the elements may exist. For example, the elements depicted in CPU 102 may be located on a single die (i.e., on-chip) or package or any of the elements of CPU 102 may be located off-chip or off-package. Similarly, the elements depicted in storage device 106 may be located on a single chip or on multiple chips coupled to a single circuit board (or multiple circuit boards). In various embodiments a storage device 106 and the host 101 may be located on the same circuit board or on the same device and in other embodiments the storage device 106 and the host may be located on different circuit boards or devices.

The components of system 100 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, and a Gunning transceiver logic (GTL) bus. In various embodiments an integrated I/O subsystem includes point-to-point multiplexing logic between various components of system 100, such as cores 114, one or more CPU memory controllers 112, I/O controller 110, integrated I/O devices, direct memory access (DMA) logic (not shown), etc. In various embodiments, components of computer system 100 may be coupled together through one or more networks comprising any number of intervening network nodes, such as routers, switches, or other computing devices. For example, a computing host (e.g., CPU 102) and the storage device 106 may be communicably coupled through a network.

Although not depicted, system 100 may use a battery and/or power supply outlet connector and associated system to receive power, a display to output data provided by CPU 102, or a network interface allowing the CPU 102 to communicate over a network. In various embodiments, the battery, power supply outlet connector, display, and/or network interface may be communicatively coupled to CPU 102. Other sources of power can be used such as renewable energy (e.g., solar power or motion based power).

Figure 2:
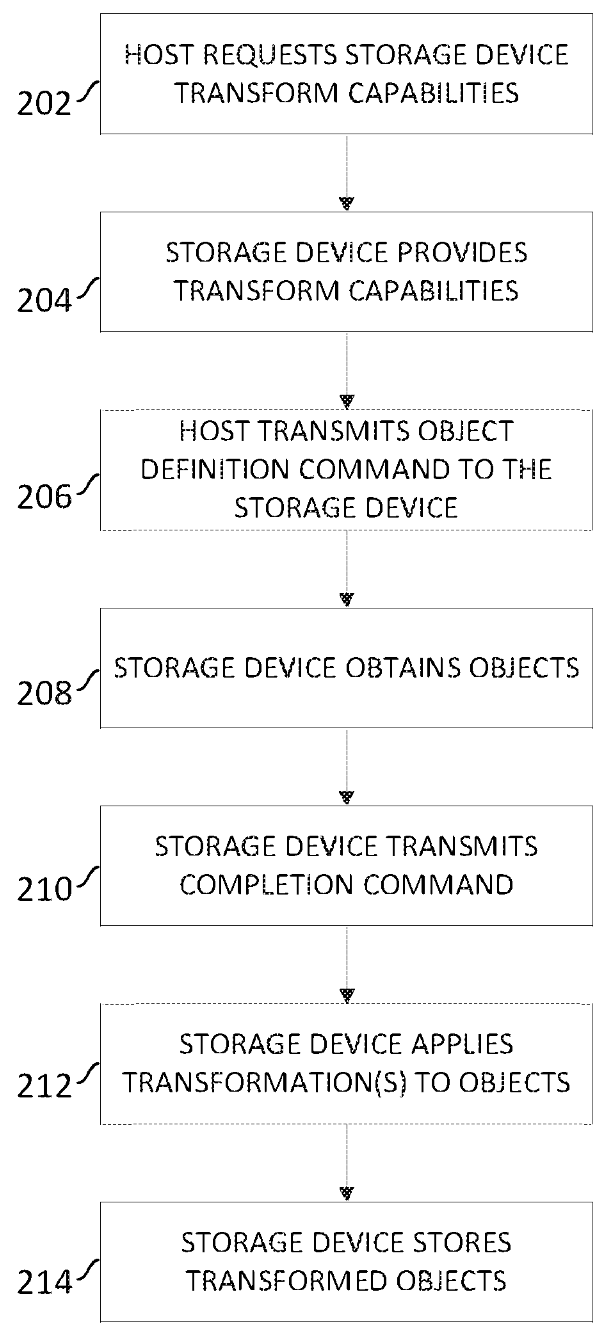
FIG. 2 illustrates an example flow for utilizing a storage device to perform multi-object calculations in accordance with certain embodiments.

FIG. 2 illustrates an example flow for utilizing a storage device to perform multi-object calculations in accordance with certain embodiments. In a particular embodiment, the command set used by the host 101 to communicate transform related requests may be provided within an existing protocol used to communicate between computing hosts and storage devices. For example, any of the commands described herein may be used in accordance with the NVMe specification (e.g., by implementing the commands using vendor specific regions of the NVMe specification). Further details of the NVMe protocol may be found in the publication, "NVM Express: Revision 1.3", published by NVM Express, Inc., on May 1, 2017 (available at http://www.nvmexpress.org/wp-content/uploads/NVM Express Revision 1.3.pdf).

At 202, host 101 requests transform capabilities of the storage device 106. In a particular embodiment, this request may be made via a "get features" command sent from the host 101 to the storage device 106. For example, the command may be an NVMe identification command (in one example, the command may have an opcode of 0x06). At 204, in response to the "get features" command, the storage device 106 may respond to the host with the object transformation capabilities of the storage device 106. The object transformation capabilities may include a list of the object types supported by the SSD and what types of transformations may be performed by the storage device 106 for each object type supported by the SSD. In various embodiments, it is the host's responsibility to discover the supported transformation operations and use that information to direct the operation of the storage device 106.

At 206, the host 101 transmits an object definition command to the storage device 106, where the object definition command specifies two or more objects and one or more transformations to be performed on the objects. The format of the object definition command may depend on whether the transformation is an inline transformation or an offline transformation. In various embodiments, storage device 106 may support inline transformations, offline transformations, or both inline and offline transformations. For an inline transformation, the host 101 includes pointers to locations associated with the host (e.g., system memory device 107 or a buffer on the host) at which objects referenced in the object definition command are stored. The storage device 106 may retrieve the objects from these locations and perform the transformation. For an offline transformation, the host 101 transmits a normal write command to the storage device 106 to store the objects at the storage device 106 (e.g., on an NVM chip 130) before the object definition command is sent (and the object definition command references the stored objects). For example, an NVMe Write write command that specifies the start LBA and the length of the LBAs to be written may be used. The storage device 106 may retrieve the objects from the storage media of the storage device 106 and then perform the transformation.

At 208, the storage device 106 obtains the objects involved in the transform. For example, the storage device 106 may retrieve the objects either from the host 101 (e.g., via system memory device 107 or other buffer) and store or stream the objects in buffer 128 (if the transformation mode is inline) or access the objects written by the host 101 to the storage device 106 (if the transformation mode is offline). In the offline transformation, the data may be accessed from a non-volatile memory region in the storage device 106 to which the data has been written and may then be made available to the transformation engine 126 (in various embodiments, this may include placing the data objects in buffer 128 or omitting the buffer 128 and placing the objects directly into memory of the transformation engine 126).

At 210, the storage device 106 transmits a completion command to the host 101. In various embodiments, this completion command is sent by the storage device 106 prior to the actual completion of the transformations, such that the host may continue operations without having to continually poll to determine when the command has actually completed. In another embodiment, the completion command could be sent upon actual completion of the object definition command.

In a particular embodiment, the completion command may have a vendor specific status code to indicate that additional information is available. In certain embodiments, the location(s) at which transformed object(s) have been stored or other identifiers associated with the transformed object(s) (e.g., a unique object ID and/or an indication of the transformation type for each transformed object) are transmitted with the completion command (or a pointer to such data may be transmitted), instead of or in addition to the vendor specific status code. In certain other embodiments, additional information such as the size of the transformed object(s) may also be transmitted in association with the completion command.

At 212, the storage device 106 applies the transformation (s) specified in the object definition command. In a particular embodiment, this may include copying the objects to the appropriate module(s) of transformation engine 126 and applying the transformation(s) to generate at least one transformed object. At 214, the storage device 106 stores the at least one transformed object. Optionally (e.g., if specified by the object definition command), any intermediate transforms may also be stored by the storage device 106. The results (i.e., transformed objects) may be stored in non-volatile memory of the storage device 106 (e.g., on an NVM chip 130). The results may then be retrievable from the storage device 106 by the host 101 at any suitable time.

Figure 3:
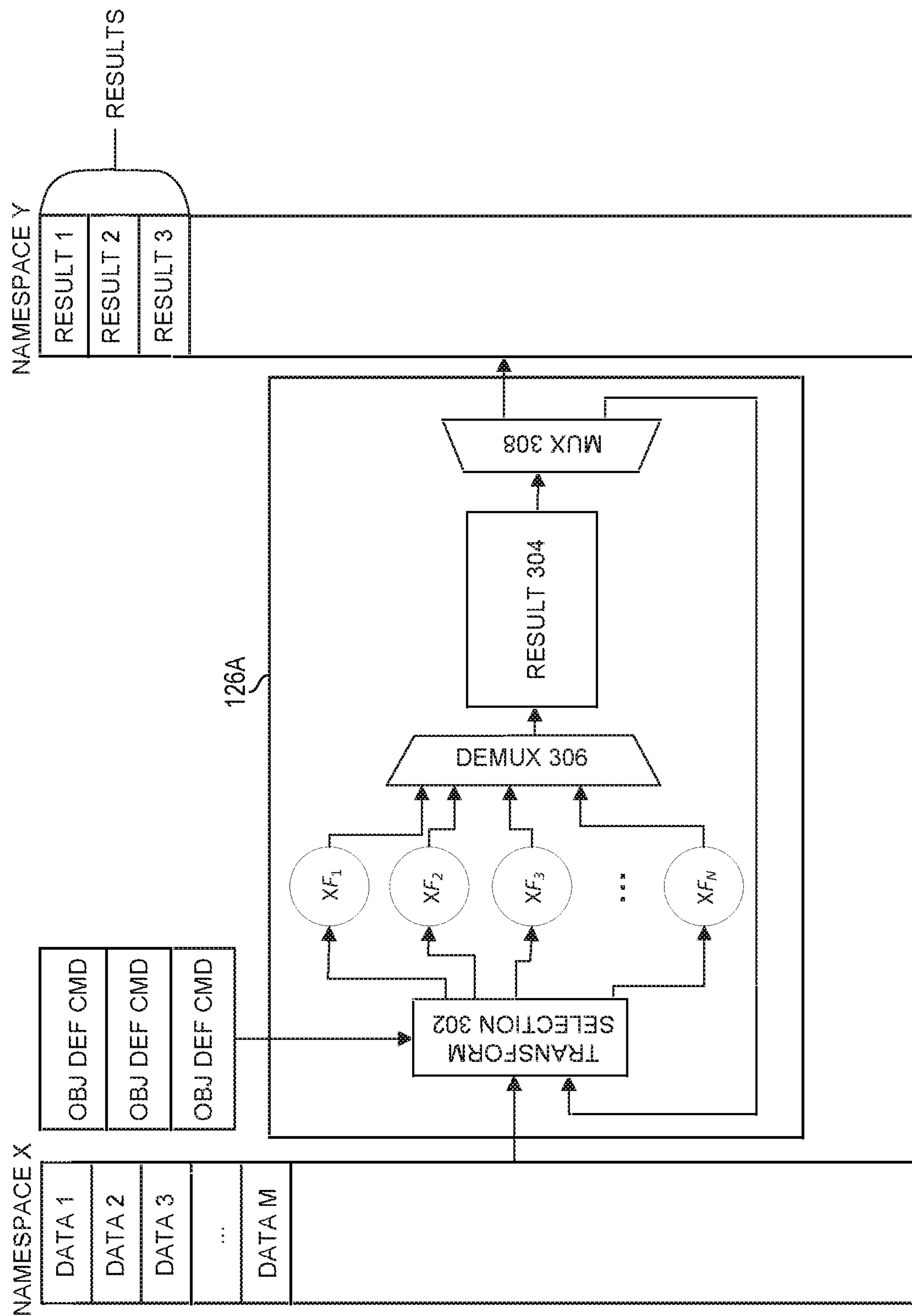
FIG. 3 illustrates an example architecture for performing an offline multi-object transformation in accordance with certain embodiments.

FIG. 3 illustrates an example architecture for performing an offline multi-object transformation in accordance with certain embodiments. The architecture includes a first namespace X. A namespace may be a logical partition of storage device 106. As just one example, a namespace may be a directory (e.g., a storage partition assigned to a drive letter) that may comprise a plurality of logical blocks which may be used to store data. Namespace X may include a collection of original data objects (e.g., Data 1-Data M) that are used as inputs to the transformation engine 126A (which represent a particular embodiment of transformation engine 126). In a particular embodiment, the memory region of namespace X is located on non-volatile memory of storage device 106, such as one or more NVM chips 130. In a particular embodiment, the host 101 may transfer objects to namespace X on the storage device 106 by using a write operation (e.g., a standard write operation that specifies one or more LBAs and data located in system memory device 107 that is to be written to the one or more LBAs).

The architecture includes a second namespace Y. Namespace Y includes a collection of results (i.e., transformed objects) that are output by the transformation engine 126A. In a particular embodiment, the memory region of namespace Y is located on non-volatile memory of storage device 106, such as one or more NVM chips 130. In various embodiments, different namespaces may be used to store the original objects and the transformed objects, though in a particular embodiment, original objects and transformed objects may be stored on the same namespace.

Transform selection logic 302 (which may be part of transformation engine 126A or storage device controller 118) is operable to analyze an object definition command and determine the next transformation that is to be performed as well as which object(s) are to be transformed. Transform selection logic 302 may also verify that the specified transformation is valid for the specified object(s) (if the specified transformation is not valid, the logic 302 may return an error to the host). Transform selection logic 302 may access the appropriate object(s) from namespace X and supply the object(s) to the appropriate transform module (e.g., one of $XF_1$-$XF_N$). The selected transform module generates a result 304 (which is passed through demultiplexer 306). If the result is a final result, it may be passed through multiplexer (mux) 308 and stored in namespace Y. Alternatively, if this result is an intermediate result (e.g., an object definition command may specify several sequential transforms to be performed in order to generate a final result, thus each result prior to the final result may be termed an intermediate result), the intermediate result may be fed through mux 308 back to the transform selection logic 302. Thus, transformation engine 126A may include a feedback loop in which the transformation engine 126A iteratively processes an intermediate result from a previous transform to generate a next intermediate result. Optionally, the intermediate result may be stored in namespace Y along with final results.

Figure 4:
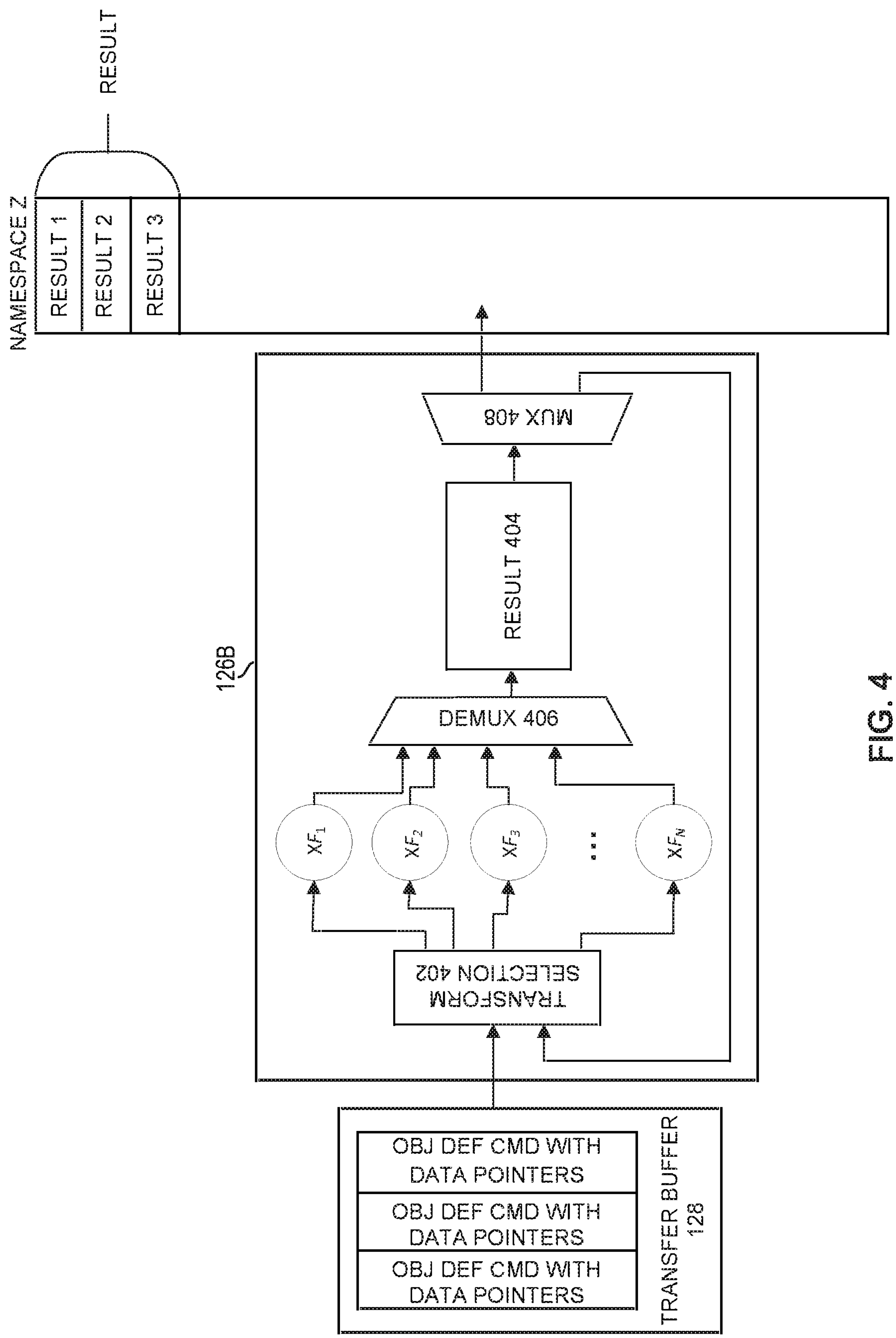
FIG. 4 illustrates an example architecture for performing an inline multi-object transformation in accordance with certain embodiments.

FIG. 4 illustrates an example architecture for performing an inline multi-object transformation in accordance with certain embodiments. In the inline mode, the objects are first transferred from the host (e.g., via a system memory device 107) to the internal transfer buffer 128 (e.g., a large SRAM) of the storage device 106. In various embodiments, when the inline mode is used, the original objects that are used as inputs to the transformation engine 126B (which represent another example of transformation engine 126) are not persistently written to the storage device 106 (though in other embodiments, the original objects may also be written to non-volatile memory of storage media 116). In a particular embodiment, the transformation engine 126B may perform transforms in a streaming mode as objects may be fetched by the storage device 106 in a streaming mode via the pointers in the object definition commands (a PRP list comprising such pointers is described below in connection with FIG. 6) provided by the host 101.

The architecture also includes a namespace Z. Namespace Z includes a collection of results that are output by the transformation engine 126B. These results are the transformed data. In a particular embodiment, the memory region of namespace Z is located on non-volatile memory of storage device 106, such as one or more NVM chips 130.

Transform selection logic 402 (which may be part of transformation engine 126B or storage device controller 118) is operable to analyze an object definition command stored in the transfer buffer 128 and determine the next transformation that is to be performed as well as which object(s) are to be transformed. Transform selection logic 402 may also verify that the specified transformation is valid for the specified objects (if the specified transformation is not valid, the logic 402 may return an error to the host). Transform selection logic 402 may access the appropriate object(s) from transfer buffer 128 and supply the object(s) to the appropriate transform module (e.g., one of $XF_1$-$XF_N$). The selected transform module generates a result 404 (which is passed through demultiplexer 406). If the result is a final result, it may be passed through mux 408 and stored in namespace Z. Alternatively, if this result is an intermediate result, the intermediate result may be fed through mux 408 back to the transform selection logic 402. Thus, transformation engine 126B may include a feedback loop in which the transformation engine 126B iteratively processes an intermediate result from a previous transform to generate a next intermediate result. Optionally, the intermediate result may be stored in namespace Z along with final results.

Figure 5:
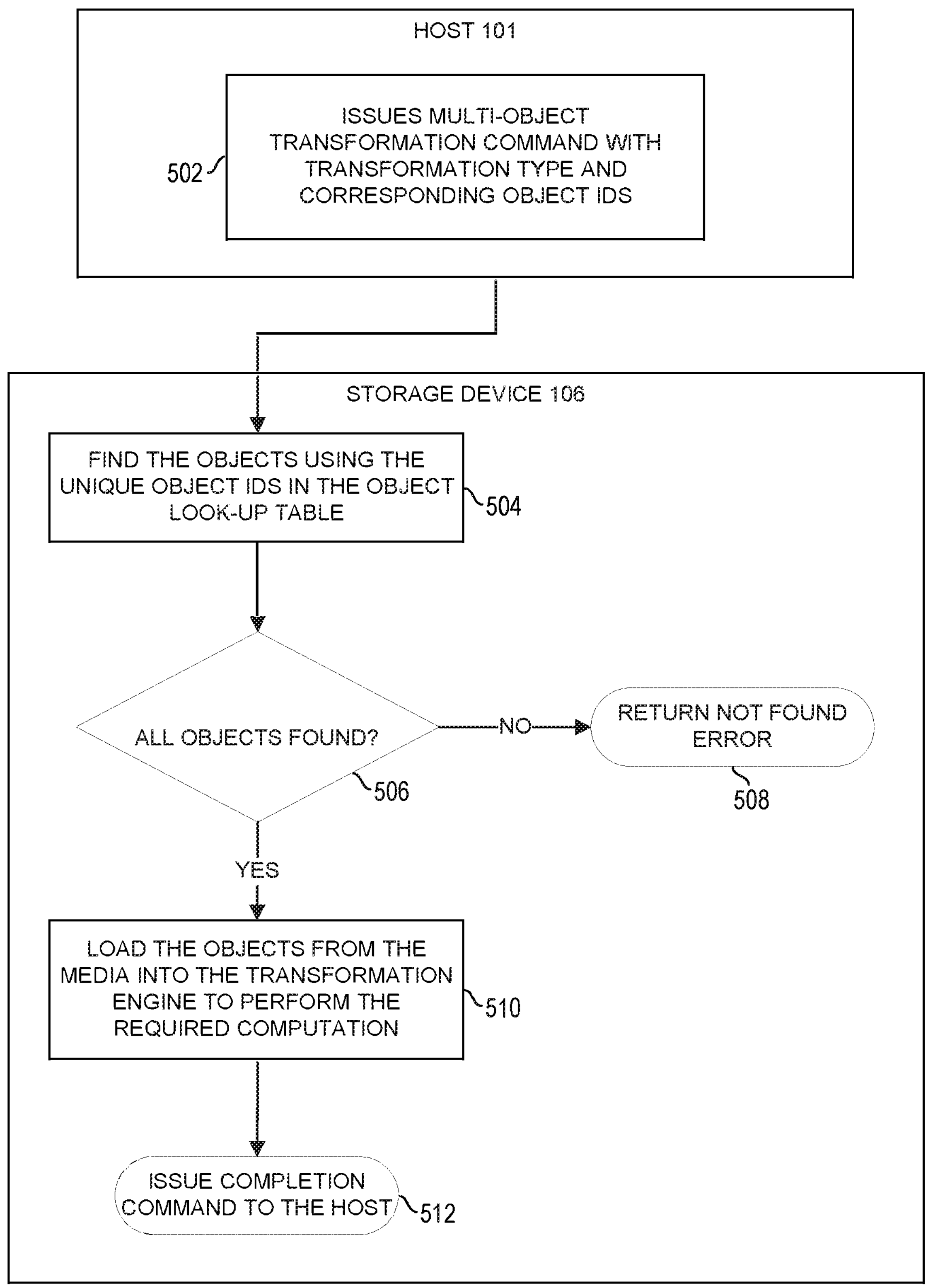
FIG. 5 illustrates an example flow for processing a multi-object calculation in accordance with certain embodiments.

FIG. 5 illustrates an example flow for processing a multi-object transformation command in accordance with certain embodiments. At 502, host 101 issues a multi-object transformation command (e.g., an object definition command specifying a transform involving multiple objects) with a transformation type (i.e., an indication of which transform operation should be performed) and corresponding object IDs (i.e., identifications of each object that is an input into the transformation).

At 504, the storage device 106 finds the objects using the unique object IDs in an object look-up table maintained by the storage device (to be described in more detail in connection with FIG. 8). In another embodiment, the multi-object transformation command may include locations of the objects and the storage device 106 may stream the objects into the storage device. At 506, a determination of whether all objects have been found is made. If all objects have not been found, a not found error is returned to the host at 508. If all objects have been found, the objects are loaded from media of storage device 106 into the transformation engine 126 to perform the required computation. At 512, a completion command is issued by the storage device 106 to the host 101.

FIG. 6 illustrates a block diagram of an object definition command 600 transmitted from a host 101 to storage device 106 in accordance with certain embodiments. This is a non-limiting example, as a command requesting a multi-object transformation may take many different forms in various embodiments. In embodiments where the NVMe protocol is used, the object definition command 600 may be defined as a vendor unique command. Other protocols besides the NVMe protocol may be used in other embodiments.

In a particular embodiment, object definition command 600 is a vendor specific object definition command that may store up to "N" references to different objects and up to N−1 transformation types (depicted as "computation 1", "computation 2", etc.). Various fields of the object definition command 600 are described below (numbered in order of appearance from the bottom right):

(1) OPCODE: Opcode for object definition command. In a particular embodiment, possible opcodes correspond to "read objects", "write objects", and "perform multi-object calculation".

(2) CMD ID: Command identifier (ID), a value that specifies that this command relates to the transformation capabilities of the storage device 106 (as opposed to a CMD ID that specifies a standard storage device operation).

(3) # OF OBJECTS: A representation of the number of objects referenced by the object definition command.

(4) PRP LIST: A pointer to a list of host memory address locations (or the list of locations itself) where the original objects are present. The PRP list may include pointers to the objects at the host 101 (e.g., pointers to locations in system memory device 107) and is used in the inline transformation mode (i.e., streaming mode) so that the original objects may be transferred from the host 101 to the storage device 106. In the offline mode (where the data has already been written to the storage device 106 prior to issuance of the object definition command), the contents of the PRP list field are not used (or are used to carry other data).

(5) SOURCE NAMESPACE #: Identification of the namespace where the original object should be stored (e.g., when using inline mode).

(6) START LBA #: Starting LBA location of the original object (relative to the data collection that is streamed via the PRP list when using inline mode).

(7) EN #: A flag that informs the storage device 106 whether to store the result of the computation as a new object in the storage media of storage device 106. May be set on each row (excepting the first row) if all intermediate results are to be stored. If set, a new entry will be created in the object look-up table to be explained in connection with FIG. 8.

(8) COMPUTATION #: Unique ID for a transformation type to be performed by transformation engine 126 of the storage device 106. Various examples of transformation types include vector/matrix computations such as vector/matrix addition (+), subtraction (−), and multiplication (*); vector/matrix piecewise manipulation, including piecewise addition (.+), piecewise subtraction (.−), and piecewise multiplication (.*); dot product (.); absolute value of difference (|-|); norm (||-||); Euclidean distance, table-search, table-join, or other suitable transformations. In various embodiments, if this value is set to "0" or other suitable value, the storage device will simply load the object specified in the corresponding row for a calculation specified by the next row (rather than perform a calculation on that object along with a previous intermediate result).

(9) OBJECT ID #: unique ID representing each data object used in a computation. This may be used to determine the location of the object when the object is already located on the storage device 106.

The object definition command 600 may include any suitable combination of parameters (and some of the parameters are not necessarily used in each instance of an object definition command). In a particular embodiment, the object definition command 600 may also include a parameter to specify a namespace ID where the transformed data is to be stored. In an embodiment, the object definition command 600 may specify the size of an object (e.g., in number of LBAs or bytes). In an embodiment, the object definition command 600 may specify the location of an object (e.g., the LBA at which the object is stored on storage device 106).

In a particular embodiment, the object definition command may be used to register one or more objects that have already been written to the storage device 106 to enable the objects to be used in transformation operations. As one example, the registration may be performed via an object definition command that includes an opcode value corresponding to "write object(s)" or "register object(s)" as well as LBA length, object size, and/or object type of each of the objects to be registered. Upon receiving such a command, the storage device 106 may update its lookup table (to be described in more detail in connection with FIG. 8) with this information.

In a particular embodiment, the order of computations/transformations performed is determined by the order of the objects specified in the command. For example, in the embodiment depicted, computation 1 would first be performed on object 0 and object 1 to generate a transformed object. Next, computation 2 would be performed on object 2 and the result of the first computation (i.e., the transformed object). These sequential calculations would continue until computation n is performed on object n and the last intermediate result.

FIG. 7 illustrates a block diagram of an object definition command 700 for processing an image frame difference in accordance with certain embodiments. The image frame difference algorithm is widely used in video segmentation. The basic principle of this method includes calculating the differences (or distance) between two contiguous images. The storage device 106 can be used to process the image frame difference algorithm by saving the images as data objects and performing the depicted object definition command.

In performing the object definition command 700, the storage device 106 may:

1. Read the image corresponding to object 0 ("image 0") and read the image corresponding to object 1 ("image 1") from the storage media of the storage device 106 by using the object look-up table (to be described in connection with FIG. 8) with the object #s as the input to the table.

2. Calculate the absolute value of the difference between image 0 and 1 and save the result as a new object in the storage media 116 of the storage device 106.

3. Read the image corresponding to object 2 ("image 2") from the storage media of the storage device. Because image 1 was read by the previous operation (and may still be stored in a buffer of the transformation engine 126), image 1 may not need to be read from the storage media at this point.

4. Calculate the absolute value of the difference between image 1 and image 2 and save the result as a new object in the storage media.

5. Repeat steps 3 and 4 (with the corresponding objects) until all the objects of the command have been processed.

6. A completion command will be sent to host 101 (at any suitable time prior to or after performance of all the computations), and the host 101 can read the results back by using the information provided in the completion command.

In certain embodiments, the results of the transformations are sent from the storage device 106 to the host 101 through an NVMe completion command (or other suitable message) which indicates success or failure. In a particular embodiment, the completion command may include a pointer to a completion log that may indicate the success or failure of the different transformation results or provide other suitable information associated with the transforms (or the information may be provided within the completion command itself). Other various example fields of the completion command are as follows:

(1) CMD ID: Command identifier.

(2) # OF OBJECTS: For a given multiple object computation command (e.g., as shown in FIG. 7), the computation results may contain multiple objects (e.g., one object for each EN # value that is set). This field returns the number of new objects generated from the performance of the object definition command.

(3) OBJECT ID #(s): The object ID of each new object generated from performance of the object definition command. The host 101 can use these IDs to read the generated objects.

(4) COMPUTATION #(s): For a particular object ID, a computation # may specify the type of transformation performed to generate the object. This may be particularly useful for single object transformations (as described below in connection with FIG. 9).

In various embodiments, the storage device 106 may support immediate completion and background-operation for offline operations. That is, once the storage device 106 has verified that all of the objects and computations referenced in the object definition command are valid, the storage device 106 may send the host a completion command. The storage device 106 may then proceed to perform the calculations and generate the transformed objects. If the host 101 requests one of the transformed objects before the processing is completed on the transformed object, the storage device 106 may delay the response to the host 101 until the result is available or may return a response indicating that the request is pending. This particular scheme may allow the host 101 to omit polling the results of the object definition command. Similarly, if the host 101 sends a command to manipulate data stored in LBA-ranges that are in background use for multi-object transformations by the storage device, then the command's completion may be delayed or an response indicating that the request is pending may be returned.

FIG. 8 illustrates an example object lookup table 800 of storage device 106 in accordance with certain embodiments. When an original object or a transformed object is saved in the storage device 106, the storage device (e.g., via the controller 118) will add an entry into the object look-up table 800 to track the locations (e.g., LBAs) of the objects or results internally.

Object lookup table 800 includes fields for unique object ID, computation #, start LBA, LBA length, object size (in bytes), and object type. The unique object ID is the same as the object ID shown in FIG. 6 (and returned in the completion command). The computation # is the same as in FIG. 6 and is used to indicate the transformation that was performed to generate a transformed object. If this is set to 0, the object is the original object. In some embodiments, a unique object ID may be the same for multiple objects and the objects may be distinguished by the computation #. For example, the same unique object ID may be refer to an original object (computation #0), a first object computed by performing a first transformation on the original object (computation #1), a second object computed by performing a second transformation on the original object (computation #2), etc. For each transformed object that is the output of a multi-object transformation (i.e., a transform with two input objects) that is stored at the storage device, a new unique object ID may be generated to uniquely identify the object. In some embodiments, the transformed object may also be associated with a computation #.

The start LBA may be the same as in FIG. 6. In an embodiment, the start LBA may be translated by the address translation engine 120 to determine the physical location of the object. The LBA length specifies the number of LBAs occupied by the object, the object size includes the size of the object in number of bytes, and the object type indicates one of the object types defined for the storage device 106 (e.g., as may be specified in response to the get features command).

Figure 9:
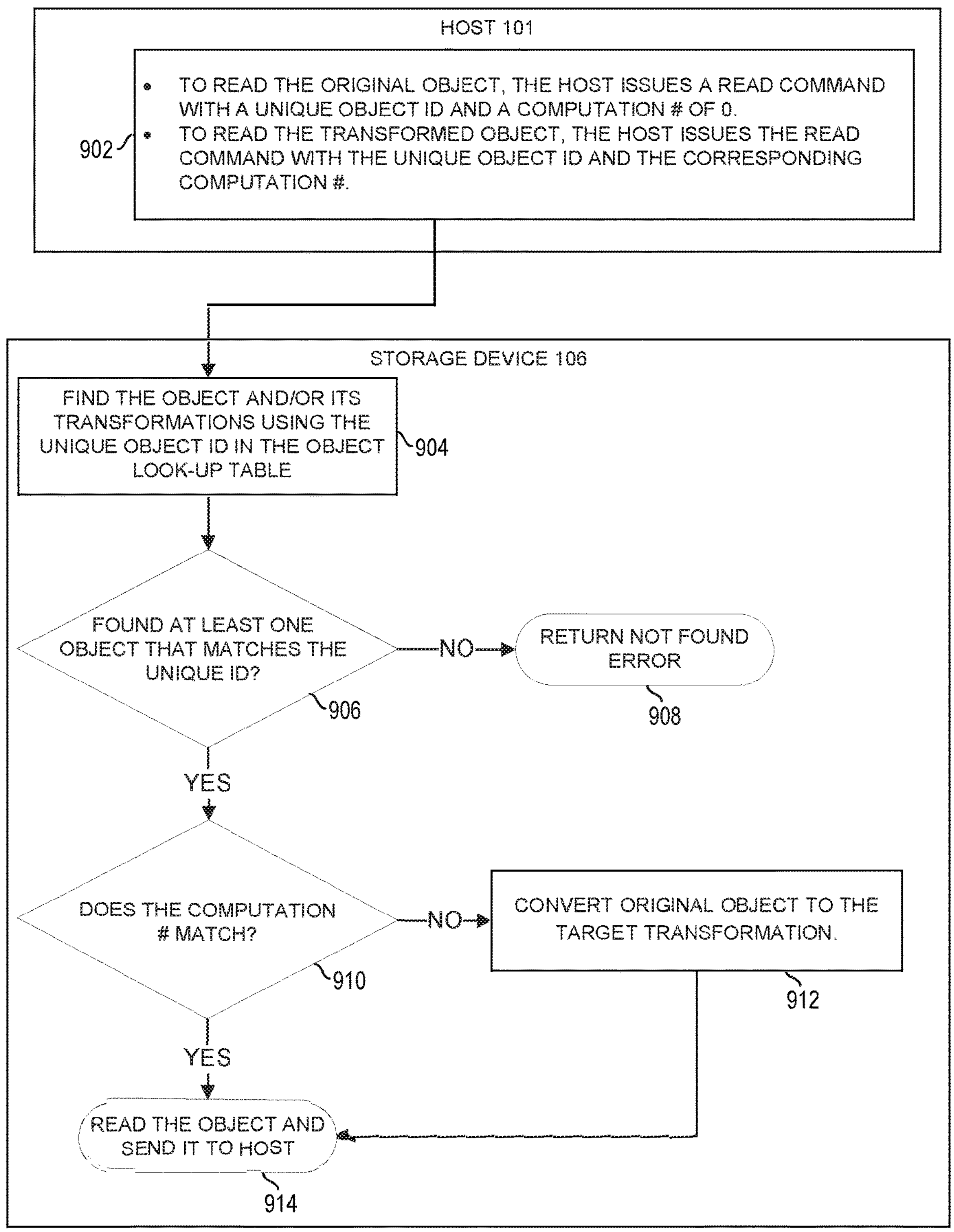
FIG. 9 illustrates an example flow for reading a transformed object from a storage device in accordance with certain embodiments.

FIG. 9 illustrates an example flow for reading a transformed object from a storage device in accordance with certain embodiments. At 902, the host 101 generates a read command. In a particular embodiment, the read command is an object definition command 600 with an opcode corresponding to "read data." If the original object is to be read, the computation # of 0 may be set in the read command. If a transformed object is to be read, the computation # may be set to the appropriate value (i.e., to the number corresponding to the type of transformation that was performed to generate the transformed object). The unique object ID for the object is also set in the read command. The host 101 then transmits the read command to the storage device 106.

At 904, the object ID is used to access the object lookup table of the storage device. At 906, a determination is made as to whether at least one object was found that matches the unique object ID. If not, a "not found" error is returned by the storage device 106 to host 101 at 908. If at least one object matched the unique ID, it is determined whether an object also matched the computation # specified in the read command at 910. If an object matched, the object is read from the storage device and returned to the host at 914. If an object didn't match at 910, the original object may be used to generate the target transformed object at 912 (i.e., transformation engine 126 may receive the original object and the computation # as inputs and may output the transformed object) which is then returned to the host at 914. If the original object is unavailable, a different transformed object may be converted back to the original object (e.g., via an inverse transformation of the type applied to generate the different transformed object) and then the transformation type specified by the computation # of the read command may be applied to the result to generate the desired transformed object, which is returned to the host at 914.

Various embodiments may also provide a mechanism for the storage device 106 to survive expected and/or unexpected power losses and to resume multi-object transformations after power is resumed. In a particular embodiment, the storage device 106 reserves a Power Loss Imminent (PLI) band for surprise power loss. In the off-line mode (e.g., when data is written to the storage device prior to the submission of the object definition command), the storage device 106 may either issue the completion command to the host when the transformation is done or may issue the completion command immediately after reception of the object definition command while performing the specified transformation(s) in the background. If a surprise power loss happens during this process, the storage device (e.g., via controller 118) saves the current transformation states (e.g., how may LBAs or bytes of the object definition command have been processed or which transformations have been performed) into the PLI band, and resumes the transformations in the subsequent power-up.

The flows described in FIGS. 2, 5, and 9 are merely representative of operations that may occur in particular embodiments. In other embodiments, additional operations may be performed by the components of system 100. Various embodiments of the present disclosure contemplate any suitable signaling mechanisms for accomplishing the functions described herein. Some of the operations illustrated in FIGS. 2, 5, and 9 may be repeated, combined, modified or deleted where appropriate. Additionally, operations may be performed in any suitable order without departing from the scope of particular embodiments.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the manufacture of the described hardware.

In any representation of the design, the data representing the design may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

Thus, one or more aspects of at least one embodiment may be implemented by representative instructions stored on a machine-readable medium which represents various logic within the processor, which when read by a machine causes the machine to fabricate logic to perform the techniques described herein. Such representations, often referred to as "IP cores" may be stored on a non-transitory tangible machine readable medium and supplied to various customers or manufacturing facilities to load into the fabrication machines that manufacture the logic or processor.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In various embodiments, the language may be a compiled or interpreted language.

The embodiments of methods, hardware, software, firmware or code set forth above may be implemented via instructions or code stored on a machine-accessible, machine readable, computer accessible, or computer readable medium which are executable (or otherwise accessible) by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information therefrom.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Logic may be used to implement any of the flows (e.g., the flows of FIGS. 2, 5, and 9) or functionality of any of the various components depicted throughout the figures, such as host 101, storage device 106, storage device controller 118, transformation engine 126, system memory device 107, transform selection logic 302 or 402, the various transformation modules, subcomponents of any of these, or other component described herein. "Logic" may refer to hardware, firmware, software and/or combinations of each to perform one or more functions. As an example, logic may include hardware, such as a micro-controller or processor, associated with a non-transitory medium to store code adapted to be executed by the micro-controller or processor. Therefore, reference to logic, in one embodiment, refers to the hardware, which is specifically configured to recognize and/or execute the code to be held on a non-transitory medium. Furthermore, in another embodiment, use of logic refers to the non-transitory medium including the code, which is specifically adapted to be executed by the microcontroller to perform predetermined operations. And as can be inferred, in yet another embodiment, the term logic (in this example) may refer to the combination of the hardware and the non-transitory medium. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components, which may be implemented by, e.g., transistors. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. Often, logic boundaries that are illustrated as separate commonly vary and potentially overlap. For example, first and second logic may share hardware, software, firmware, or a combination thereof, while potentially retaining some independent hardware, software, or firmware.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

Example 1

An example storage device comprises non-volatile storage media; a controller to receive, from a host, an object definition command that identifies a first data object and a second data object and a transformation to apply to the first data object and the second data object to generate a first transformed object, and store the first transformed object in the non-volatile storage media; and a transformation engine to apply the transformation to the first data object and the second data object.

Example 2

The storage device of Example 1, wherein the transformation comprises a matrix or a vector operation.

Example 3

The storage device of any of Examples 1-2, wherein the object definition command further specifies a third data object and a transformation to apply to the first transformed object and the third data object.

Example 4

The storage device of any of Examples 1-2, wherein the object definition command further specifies a third data object and a fourth data object and a transformation to apply to the third data object and the fourth data object.

Example 5

The storage device of any of Examples 1-4, the controller to receive, from the host, at least one write command specifying the first data object and the second data object prior to receiving the object definition command; and store the first data object and the second data object to the non-volatile storage media.

Example 6

The storage device of any of Examples 1-5, wherein the object definition command further specifies a list of memory locations in a system memory device of the host, wherein the memory locations include a first memory location of the first data object and a second memory location of the second data object.

Example 7

The storage device of any of Examples 1-6, wherein the controller is to transfer the first data object and the second data object to a static random access memory of the storage device prior to the application of the transformation.

Example 8

The storage device of any of Examples 1-7, the controller to send a completion command associated with the transformation to the host prior to the application of the transformation.

Example 9

The storage device of any of Examples 1-8, the controller to receive a request from the host for the first transformed object prior to completion of the transformation; and delay a response to the request until the transformation is complete.

Example 10

The storage device of any of Examples 1-9, the controller to receive an indication of a power loss to the storage device; save the completion state of the object definition command; and resume operation of the object definition command upon restoration of power.

Example 11

An example method comprises receiving, at a storage device, an object definition command from a host, the object definition command identifying a first data object and a second data object and a transformation to apply to the first data object and the second data object to generate a first transformed object; applying, by a transformation engine, the transformation to the first data object and the second data object to generate the first transformed object; and storing the first transformed object in non-volatile storage media of the storage device.

Example 12

The method of Example 11, further comprising applying, by the transformation engine, a second transformation to a third data object and a fourth data object identified in the object definition command to generate a second transformed object.

Example 13

The method of any of Examples 11-12, further comprising applying, by the transformation engine, a transformation to the first transformed object and a third data object specified in the object definition command.

Example 14

The method of any of Examples 11-13, further comprising receiving, from the host, at least one write command specifying the first data object and the second data object prior to receiving the object definition command; and storing the first data object and the second data object to the non-volatile storage media.

Example 15

The method of any of Examples 11-14, wherein the object definition command further specifies a list of memory locations in a system memory device of the host, wherein the memory locations include a first memory location of the first data object and a second memory location of the second data object.

Example 16

The method of any of Examples 11-15, further comprising transferring the first data object and the second data object to a static random access memory of the storage device prior to the application of the transformation.

Example 17

The method of any of Examples 11-16, further comprising sending a completion command associated with the transformation to the host prior to the application of the transformation.

Example 18

The method of any of Examples 11-17, further comprising: receiving a request from the host for the first transformed object prior to completion of the transformation; and delaying a response to the request until the transformation is complete.

Example 19

The method of any of Examples 11-18, wherein the transformation comprises a matrix or a vector operation.

Example 20

The method of any of Examples 11-19, further comprising receiving an indication of a power loss to the storage device; saving the completion state of the object definition command; and resuming operation of the object definition command upon restoration of power.

Example 21

The method of any of Examples 11-20, further comprising sending capabilities of the storage device for applying transformations on offloaded objects to the host.

Example 22

The method of any of Examples 11-21, further comprising receiving the first data object and second data object from an input/output device and storing the first data object and second data object in a system memory device prior to sending the object definition command to the storage device.

Example 23

An example computer system comprises a host comprising a processor; a system memory device; and a storage device to receive, from the host, an object definition command that identifies a first data object and a second data object and a transformation to apply to the first data object and the second data object to generate a first transformed object; apply, via a transformation engine of the storage device, the transformation to the first data object and the second data object to generate the first transformed object; and store the first transformed object in non-volatile storage media of the storage device.

Example 24

The computer system of Example 23, the storage device to send capabilities of the storage device for applying transformations on offloaded objects to the host.

Example 25

The computer system of Example 23, wherein the object definition command further specifies a third data object and a transformation to apply to the first transformed object and the third data object.

Example 26

The computer system of Example 23, wherein the processor is to receive the first data object and second data object from an input/output device and store the first data object and second data object in the system memory device prior to sending the object definition command to the storage device.

Example 27

The computer system of Example 23, further comprising one or more of: a battery communicatively coupled to the processor, a display communicatively coupled to the processor, or a network interface communicatively coupled to the processor.

Example 28

An example system comprising means to receive an object definition command from a host, the object definition command identifying a first data object and a second data object and a transformation to apply to the first data object and the second data object to generate a first transformed object; means to apply the transformation to the first data object and the second data object to generate the first transformed object; and means to store the first transformed object in non-volatile storage media.

Example 29

The system of Example 28, further comprising means to apply a second transformation to a third data object and a fourth data object identified in the object definition command to generate a second transformed object.

Example 30

The system of Example 28, further comprising means to receive, from the host, at least one write command specifying the first data object and the second data object prior to receiving the object definition command; and means to store the first data object and the second data object to the non-volatile storage media.

Example 31

The system of Example 28, wherein the object definition command further specifies a list of memory locations in a system memory device of the host, wherein the memory locations include a first memory location of the first data object and a second memory location of the second data object.

Example 32

The system of Example 28, further comprising means to send a completion command associated with the transformation to the host prior to the application of the transformation.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A storage device comprising:

non-volatile storage media; and circuitry to execute logic, the logic to:

receive, from a host, a first command that indicates a first data object, a second data object, a third data object and a fourth data object, the first command to also indicate a first transformation to apply to the first data object and the second data object and to indicate a second transformation to apply to the third data object and the fourth data object;

generate a first transformed object based on application of the first transformation to the first and second data objects; and generate a second transformed object based on application of the second transformation to the third and fourth data objects.

2. The storage device of claim 1, further comprising the logic to:

cause the first and second transformed objects to be stored in the non-volatile storage media.

3. The storage device of claim 1, comprising the first command to indicate the first and second transformations via respective transformation identifiers included in the command, wherein the logic is to select the first transformation or the second transformation from a plurality of transformations performable by the logic based on the respective transformation identifiers.

4. The storage device of claim 1, wherein the first command is to also indicate a fifth data object and a third transformation to apply to the first transformed object and the fifth data object, the logic to:

generate a third transformed object based on application of the third transformation to the first transformed object and the fifth data object; and cause the third transformed object to be stored in the non-volatile storage media.

5. The storage device of claim 4, further comprising:

a buffer; and the logic to:

cause the first transformed object to be stored to the buffer; and obtain the first transformed object from the buffer to apply the third transformation to the first transformed object and the fifth data object to generate the third transformed object.

6. The storage device of claim 1, comprising the second transformation is a same type of transformation as the first transformation.

7. The storage device of claim 1, further comprising the logic to:

receive, from the host, a second command to store the first, second, third and fourth data objects, the second command received prior to receipt of the first command; and cause the first, second, third and fourth data objects to be stored in the non-volatile storage media.

8. The storage device of claim 1, further comprising:

the first command to include a pointer to at least one memory address of a system memory arranged to maintain the first, second, third and fourth data objects, the system memory located at the host; and the logic to:

obtain the first, second, third and fourth data objects from the system memory based on the pointer.

9. The storage device of claim 8, the first command comprising a video compression command, wherein the first and second transformations are to include use of image frame difference algorithms, the first, second, third and fourth data objects are respective first, second, third and fourth image frames, the video compression command to indicate a storage destination in the non-volatile media for storing generated first and second transformed objects, the logic to:

apply the first transformation to the first and second image frames to determine a first image frame difference in order to generate the first transformed object;

apply the second transformation to the third and fourth image frames to determine a second image frame difference in order to generate the second transformed object; and cause the first and second transformed objects to be stored in the non-volatile storage media at the storage destination indicated in the video compression command.

10. The storage device of claim 8, the first command comprising a compression command, wherein the first transformation is to include compression of the first and second data object and the second transformation is to include compression of the third and fourth data objects, the compression command to indicate a storage destination in the non-volatile media for storing generated first and second transformed objects, the logic to:

apply the first transformation to the first and second data objects to compress the first and second data objects in order to generate the first transformed object;

apply the second transformation to the third and fourth data objects to compress the third and fourth data objects in order to generate the second transformed object; and cause the first and second transformed object to be stored in the non-volatile storage media at the storage destination indicated in the compression command.

11. The storage device of claim 8, the first command comprising an encryption command, wherein the first and second transformations are to include encryption of the first, second, third and fourth data objects, the encryption command to indicate a storage destination in the non-volatile media for storing generated first and second transformed objects, the logic to:

apply the first transformation to the first and second data objects to encrypt the first and second data objects in order to generate the first transformed object;

apply the second transformation to the third and fourth data objects to encrypt the third and fourth data objects in order to generate the second transformed object; and cause the first and second transformed object to be stored in the non-volatile storage media at the storage destination indicated in the encryption command.

12. A method comprising:

receiving, at a storage device, a first command from a host, the first command indicating a first data object, a second data object, a third data object and a fourth data object, the first command to also indicate a first transformation to apply to the first data object and the second data object and to indicate a second transformation to apply to the third data object and the fourth data object;

generating a first transformed object based on applying the first transformation to the first and second data objects; and generating a second transformed object based on applying the second transformation to the third and fourth data objects.

13. The method of claim 12, further comprising:

storing the first and second transformed objects in non-volatile storage media located at the storage device.

14. The method of claim 12, comprising:

the first command to indicate the first and second transformations via respective transformation identifiers included in the command; and selecting the first transformation or the second transformation from a plurality of transformations performable by logic of the storage device based on the respective transformation identifiers.

15. The method of claim 12, wherein the first command is to also indicate a fifth data object and a third transformation to apply to the first transformed object and the fifth data object, the method further comprising:

generating a third transformed object based on application of the third transformation to the first transformed object and the fifth data object; and storing the third transformed object in non-volatile storage media located at the storage device.

16. The method of claim 15, further comprising:

causing the first transformed object to be stored to a buffer located at the storage device; and obtaining the first transformed object from the buffer to apply the third transformation to the first transformed object and the fifth data object to generate the third transformed object.

17. The method of claim 12, comprising the second transformation is a different type of transformation as the first transformation.

18. The method of claim 12, further comprising:

receiving, from the host, a second command to store the first, second, third and fourth data objects, the second command received prior to receipt of the first command; and causing the first, second, third and fourth data objects to be stored in non-volatile storage media located at the storage device.

19. The method of claim 12, further comprising:

the first command to include a pointer to at least one memory address of a system memory arranged to maintain the first, second, third and fourth data objects, the system memory located at the host; and obtaining the first, second, third and fourth data objects from the system memory based on the pointer.

20. The method of claim 19, the first command comprising a video compression command, wherein the first and second transformations are to include use of image frame difference algorithms, the first, second, third and fourth data objects are respective first, second, third and fourth image frames, the video compression command to indicate a storage destination in a non-volatile media located at the storage device for storing generated first and second transformed objects, the method further comprising:

applying the first transformation to the first and second image frames to determine a first image frame difference in order to generate the first transformed object;

applying the second transformation to the third and fourth image frames to determine a second image frame difference in order to generate the second transformed object; and causing the first and second transformed objects to be stored in the non-volatile storage media at the storage destination indicated in the video compression command.

21. A system comprising:

a host comprising a processor;

a system memory device arranged to store a first data object, a second data object, a third data object and a fourth data object; and a storage device to include circuitry to execute logic, the logic to:

receive, from the host, a first command that indicates the first, second, third and fourth data objects, the first command to also indicate a first transformation to apply to the first data object and the second data object and to indicate a second transformation to apply to the third data object and the fourth data object;

generate a first transformed object based on application of the first transformation to the first and second data objects; and generate a second transformed object based on application of the second transformation to the third and fourth data objects.

22. The system of claim 21, further comprising the logic to:

cause the first and second transformed objects to be stored in non-volatile storage media located at the storage device.

23. The system of claim 21, comprising the first command to indicate the first and second transformations via respective transformation identifiers included in the command, wherein the logic is to select the first transformation or the second transformation from a plurality of transformations performable by the logic based on the respective transformation identifiers.

24. The system of claim 21, comprising the processor to receive the first, second, third and fourth data objects from an input/output device and cause the first, second third and fourth data objects to be stored to the system memory device prior to sending the first command to the storage device.

25. The system of claim 21, further comprising the logic to:

receive, from the host, a second command to store the first, second, third and fourth data objects, the second command received prior to receipt of the first command; and cause the first, second, third and fourth data objects to be written to a non-volatile storage media located at the storage device responsive to the second command.

26. The system of claim 21, comprising:

the first command to include a pointer to at least one memory address of the system memory device that is arranged to store the first, second, third and fourth data objects; and the logic to:

obtain the first, second, third and fourth data objects from the system memory device based on the pointer.

27. The system of claim 26, the first command comprising a video compression command, wherein the first and second transformations are to include use of image frame difference algorithms, the first, second, third and fourth data objects are respective first, second, third and fourth image frames, the video compression command to indicate a storage destination in non-volatile media located at the storage device for storing generated first and second transformed objects, the logic to:

apply the first transformation to the first and second image frames to determine a first image frame difference in order to generate the first transformed object;

apply the second transformation to the third and fourth image frames to determine a second image frame difference in order to generate the second transformed object; and cause the first and second transformed objects to be stored in the non-volatile storage media at the storage destination indicated in the video compression command.

* * * * *